Figure 1:
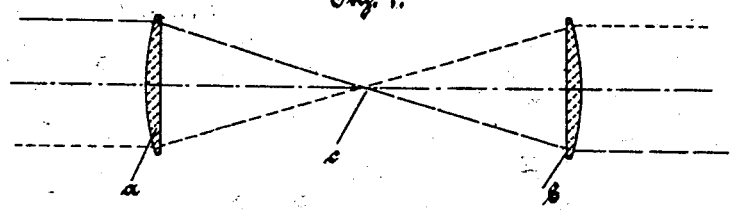

No. 882,762.

H. JACOB.
PANORAMIC TELESCOPE.
APPLICATION FILED JULY 16, 1907.

PATENTED MAR. 24, 1908.

Witnesses:

Inventor
Heinrich Jacob

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

PANORAMIC TELESCOPE.

No. 882,762.　　　Specification of Letters Patent.　　　Patented March 24, 1908.

Application filed July 16, 1907. Serial No. 383,958.

*To all whom it may concern:*

Be it known that I, HEINRICH JACOB, a citizen of the German Empire, and resident of Steglitz, near Berlin, Germany, engineer, have invented certain new and useful Improvements in Panoramic Telescopes, of which the following is a specification.

This invention relates to an optical device which allows of producing pictures reversed in only one sense relatively to the objects which they represent, that is to say, pictures in which either only the sides are reversed (right-hand and left-hand) or only the top and bottom.

The improved reversing system comprises pairs of optical systems adapted to focus in a straight line pencils of parallel rays entering the system. If optical systems having this property are placed opposite each other in pairs so that the focal lines of pencils of parallel rays coincide with each other, the rays forming a parallel pencil are, after passing through one of these pairs, still parallel but have changed sides.

The so-called cylindrical lenses are known to form optical systems adapted to focus pencils of parallel rays in one line; cylindrical lenses are lenses curved only in one sense so that their curved contours are segments of cylinders. The elements of each pair of cylindrical lenses may of course be individually composed of several lenses. As a rule it is advisable to form each pair of cylindrical lenses of elements of equal focal length, in order to avoid the distortion of the image which is inseparable from enlargements or reductions obtained with combinations of lenses of this type. The employment of elements of different focal lengths in a pair of cylindrical lenses is, of course, not precluded, and would be adopted where it is desired to obtain distortion by which circles are made to appear as ellipses, or vice-versa.

The new reversing system can be used as a substitute for the known prism reversing systems in all cases where the latter only reverse the image in one sense. The new system is of special importance in so-called panorama telescopes, that is to say, in telescopes having a rotatable receiving-reflector adapted to sweep all the objects surrounding its axis of rotation, or a portion of these objects. By using in telescopes of this type the new reversing system instead of the usual erecting prism, greater independence is secured with regard to the size of the free aperture of the reversing system, since the size of the glass bodies forming the erecting prisms no longer comes into consideration.

The invention is illustrated in the annexed drawing.

Figure 2:
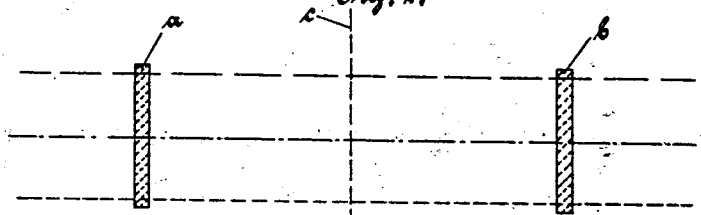

Figures 1 and 2 diagrammatically illustrate the new reversing system in its simplest form, by means of two sections which are respectively normal and parallel to the focal line. The system in this case comprises two cylindrical lenses $a$ and $b$ of equal focal length. The focal line of the two lenses is marked $c$. The raypaths indicated in the figures show that parallel rays falling upon one lens in a plane perpendicular to the focal line are parallel when passing out of the other lens, but have changed sides. Rays falling upon one of the lenses in a plane parallel with the focal line pass through the second lens without intersecting each other. It is, therefore, clear that the system only produces a reversal in one sense, by interchanging the right-hand and left-hand sides, or the top and the bottom. The space between the two lenses shown in Figs. 1 and 2 may, of course, contain additional lenses or bodies of glass, and the entire reversing system may consist of a single block of glass, the two optically active surfaces of which are segments of cylinders.

Figure 3:
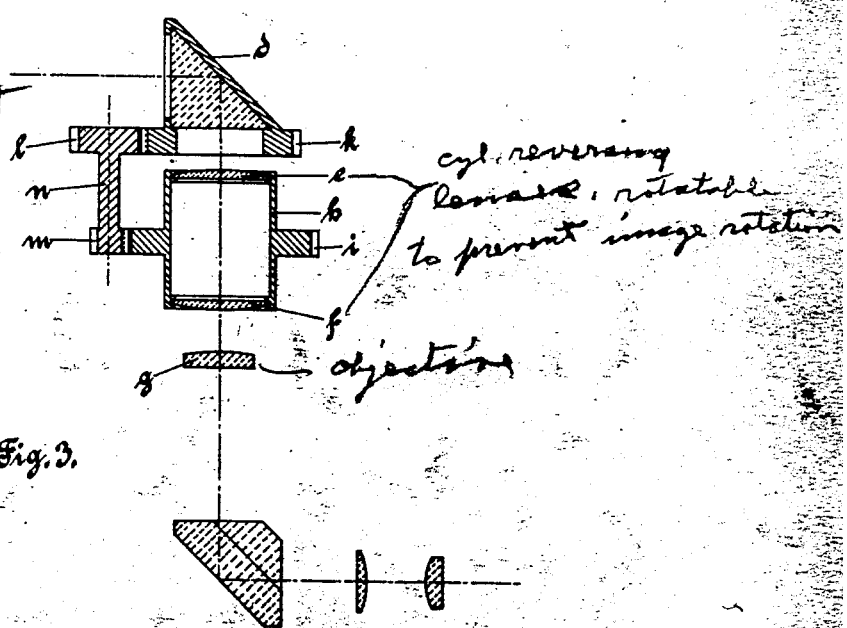

Fig. 3 is a diagrammatic axial section of a panorama-telescope provided with the new reversing system. The rotatable receiving reflector of the panorama-telescope is marked $d$, and the elements of the reversing system, which are in this case also simple cylindrical lenses, are marked $e$ and $f$; the objective lens is marked $g$. The lenses $e$ and $f$ of the reversing system are arranged in a support $h$ common to both and provided with a pinion $i$. The support of the receiving reflector $d$ is provided with a pinion $k$. Pinions $l$ and $m$ fixed to an axle $n$ couple the pinions $i$ and $k$ with each other in such a manner that the angular speed of the pinion $i$ is half that of the pinion $k$, as is the case when the ordinary erecting prisms are used in the known instruments.

Having now particularly described and ascertained the nature of my said invention and in what manner the same is to be performed, I declare that what I claim is:

1. An image-reversing system comprising a plurality of optical systems adapted to focus pencils of parallel rays in a single line, said optical systems being arranged in pairs in such relation to each other that the focal lines of each pair coincide with each other.

2. An image-reversing system comprising at least one pair of cylindrical lenses the lenses of each pair being placed relatively to each other in such a manner that their focal lines coincide with each other.

3. An image-reversing system comprising at least one pair of cylindrical lenses, the lenses of each pair having the same focal length and being placed relatively to each other in such a manner that their focal lines coincide with each other.

4. In a panorama-telescope a rotatable receiving reflector and an image-reversing system inserted in the ray-path of the instrument and coupled to said reflector, the image-reversing system comprising at least one pair of optical systems adapted to focus in a single line pencils of parallel rays.

5. In a panorama-telescope a rotatable receiving reflector and at least one pair of cylindrical lenses inserted in the ray-path of the instrument and so coupled with the receiving reflector that they move at half the angular speed of the reflector, the elements of each pair of cylindrical lenses being so placed opposite each other that their focal lines coincide.

In testimony whereof I have signed this specification in the presence of two subscribing witnesses.

HEINRICH JACOB.

Witnesses:
 HENRY HASPER,
 WOLDEMAR HAUPT.